Sept. 1, 1925.

Re. 16,150

J. E. BELL

WATER TUBE BOILER

Original Filed July 8, 1907 2 Sheets-Sheet 1

John E. Bell INVENTOR.

BY

Gifford & Bull ATTORNEYS

Sept. 1, 1925.

Re. 16,150

J. E. BELL

WATER TUBE BOILER

Original Filed July 8, 1907 2 Sheets-Sheet 2

John E. Bell INVENTOR.

BY

Giffard & Bull ATTORNEYS

Reissued Sept. 1, 1925.

Re. 16,150

UNITED STATES PATENT OFFICE.

JOHN E. BELL, OF BROOKLYN, NEW YORK, ASSIGNOR TO BABCOCK & WILCOX COMPANY, OF NEW YORK, N. Y., A CORPORATION OF NEW JERSEY.

WATER-TUBE BOILER.

Original No. 1,129,538, dated February 23, 1915, Serial No. 382,588, filed July 8, 1907. Application for reissue filed July 1, 1921. Serial No. 481,933.

*To all whom it may concern:*

Be it known that I, JOHN E. BELL, a citizen of the United States, residing at New York, borough of Brooklyn, in the county of Kings and State of New York, have invented certain new and useful Improvements in Water-Tube Boilers, of which the following is a specification, reference being had to the accompanying drawings, in which—

Figure 1:
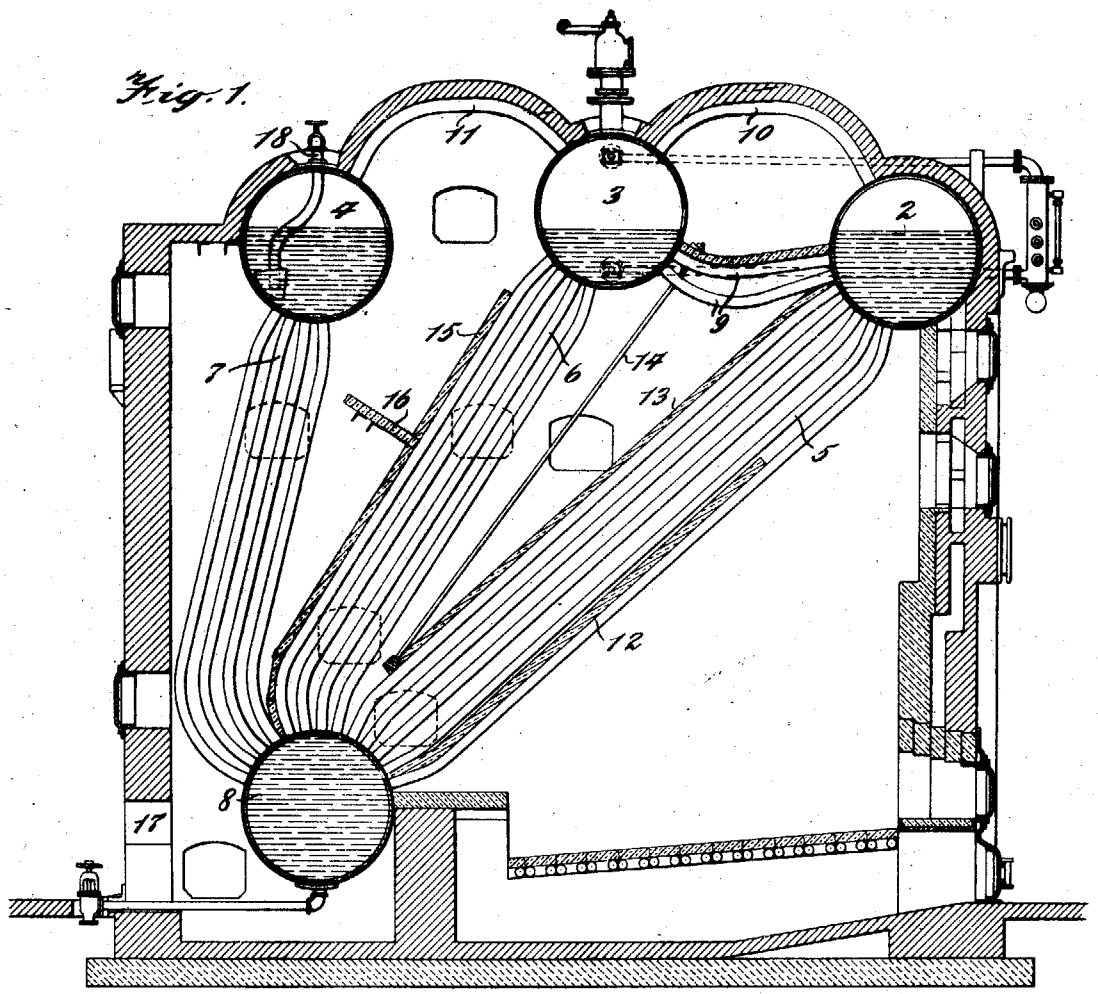
Figure 3:
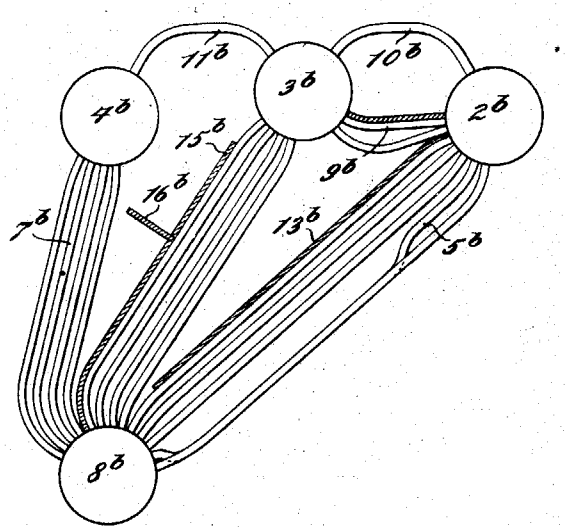
Figure 2:
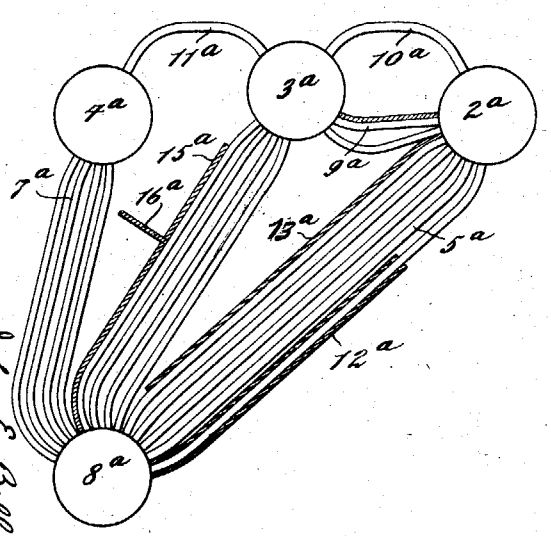

Figure 1 is a sectional side elevation showing one form of boiler constructed in accordance with my invention; and Figs. 2 and 3 are diagrammatic sectional side elevations showing modified forms.

The invention relates to boilers of the transverse-drum, multiple-bank, serial-pass type, and is designed to provide an improved arrangement of baffling whereby the gases are closely held in contact with the tubes. It is also designed to increase the amount of heating surface exposed to radiant heat.

A further object is to decrease liability to the formation of steam pockets in the front bank of tubes and insure a high velocity of the gases.

In Fig. 1 of the drawings, I show my invention as applied to a four-drum, three-bank Stirling type of boiler. In this case, 2, 3 and 4 are upper transverse steam and water drums, connected by banks of tubes 5, 6 and 7 with a lower transverse mud drum 8. Two or three transverse mud drums may be employed, either or all of which may be connected by rows of tubes. The tubes may be curved at their ends, or the drums may be struck up so as to employ straight tubes. In the form shown, 9 are water circulators connecting the water spaces of the two front upper drums, and 10 and 11 are steam circulators leading the steam from the front and rear drums to the middle drums, whence it is taken off. I have shown the front bank of tubes as leaning forwardly over the combustion chamber, this combustion chamber being freely open in its upper portion so as to expose the front wall of the setting to the heat, no roof or arch being used over the grate. Such arch may, however, be employed within the scope of my broader claims relating to the baffling. In this form, the refractory baffling consists of a baffle 12 extending upwardly from the mud drum between the first and second row of the front bank of tubes. The next baffle 13 extends from the upper steam and water drum downwardly along the rear of the front bank of tubes, being preferably supported by tension rods 14. The third baffle 15 extends along the rear of the second bank of tubes with an opening over its upper end, a shelf 16 being employed to hold the gases within the rear bank 7 in their last down pass to the off-take port 17. I have shown the water as fed into the rear upper drum through pipe 18. In the operation of the boiler, the gases flow up the front row of tubes of the front bank, thence down among the front bank of tubes, thence up the middle bank, and down the rear bank to the outlet flue. With the form of furnace shown, the size of the combustion chamber is increased, the smoke reduced to a minimum, and increased economy obtained. The front wall of the boiler setting will become highly heated, and the gases will be exposed to heated fire brick to substantially the same extent as with the arch or roof construction commonly employed in boilers of this type. In the present form, the front row of tubes is exposed to the radiating surface formed by the front wall, thus increasing the amount of radiant heat received by the tube-heating surface. As the furnace gases enter the front bank of tubes near their upper ends, the steam will be most rapidly generated in this upper portion of the tubes, and has only a short distance to travel into the front upper drum. This gives less liability to the formation of steam pockets and possible reversing of circulation. The tubes of the front bank which are in the rear of the front baffle receive the gases near their upper ends at the first contact thereof, and the major portion of the steam in these tubes is generated in their upper parts; whereas with the old style baffling, the most of the steam was produced in the lower portions of the tubes where the steam might readily pass to the mud drum rather than flow up through the tubes to the steam and water drum. In the front row of tubes of the front bank, the production of steam in the lower portion is of course not diminished in the form of Fig. 1, but as there is more steam generated in the upper portion of the bank there is less liability for reversal of circulation. It also gives a narrow pass through which the gases must flow at high velocity, insuring the maximum amount of heat being absorbed per square foot of heating surface. The furnace may be employed for coal, oil sprays, or any other desirable fuel.

In Fig. 2 I show a form similar to that of Fig. 1, except that the baffle 12[a] is composed of hollow bricks or tiles which incloses the front row of tubes. In this case the front row will only be directly exposed to the gases above the end of the baffle. In this form parts similar to those of Fig. 1 are designated by similar numerals with the letter "a" applied.

In Fig. 3 I show a form similar to that of Fig. 1, except that the front baffle is obtained by bending portions of the second row of tubes 5[b] into the spaces between the front set of tubes along the baffling portions. The upper portions of the second row being in their normal position will allow the gases to flow through after they reach the upper end of the forwardly bent portions.

By the words "baffle element" in my claims, I intend to cover any form of baffling device, not only such as those I have shown, but all other forms. I also intend, in my claims, to cover the structure whether one or more mud drums or lower water spaces is used.

The tubes may be straight or curved; the number of steam and water drums or mud drums may be varied; two or more banks of tubes may be used; and many other changes may be made without departing from my invention.

By the word "group" I mean to include all the tubes located between baffles or between a baffle and a setting wall, and forming heating surface, irrespective of the particular upper drum or drums to which they are connected.

I claim:—

1. A transverse-drum, serial-pass, multiple-bank boiler having three upper drums directly connected to a lower drum by groups of tubes all forming heating surface and arranged in fan shape, the front group inclining upwardly and forwardly over the combustion chamber and facing the front setting wall, and baffling arranged to give the gases a first upward pass longitudinally of the front group and thence down longitudinally of and over a group of tubes having greater heating surface than that of the front group, thence upwardly longitudinally of a group of tubes connected to the middle upper drum, and thence downwardly over another group of tubes.

2. A transverse-drum, serial-pass, multiple-bank boiler having three upper drums directly connected to a lower drum by groups of tubes all forming heating surface and arranged in fan shape, the front group inclining upwardly and forwardly over the combustion chamber and facing the front setting wall, and baffling arranged to give the gases a first upward pass longitudinally of the front group and thence down longitudinally of and over a group of tubes having greater heating surface than that of the front group, thence upwardly longitudinally of a group of tubes connected to the middle upper drum, and thence downwardly over another group of tubes connected to the rear upper drum.

3. In a vertical water tube boiler, the combination with a combustion chamber, transverse upper steam and water drums, a lower mud drum, and a plurality of banks of upwardly extending tubes, each bank connecting one of the upper drums with the lower drum, the front bank inclining upwardly and forwardly over the combustion chamber and facing the front setting wall, of a front baffle extending upwardly and longitudinally along the first bank from the lower end and at the rear of some of the tubes thereof, and terminating short of the upper end thereof, said baffle constituting the rear wall of said combustion chamber and the exit from said combustion chamber being over said baffle and among the upper end of the first bank of tubes, and a second baffle extending longitudinally along the rear of said first bank from the upper end thereof, and terminating short of the lower end, the major portion of the tubes in the first bank being located between the first and the second baffles, said baffles thereby compelling the heated gases to first enter the upper end of the first bank and then traverse the said first bank longitudinally downwardly from its upper to its lower end and counter to the circulation in the tubes of said bank, substantially as described.

4. In a vertical water tube boiler, the combination with a combustion chamber, transverse upper steam and water drums, a lower mud drum, and a plurality of banks of upwardly extending tubes, each bank connecting one of the upper drums with the lower drum, the front bank inclining upwardly and forwardly over the combustion chamber and facing the front setting wall, said furnace chamber being substantially unobstructed, of a front baffle extending upwardly and longitudinally along the first bank from the lower end and at the rear of some of the tubes thereof, and terminating short of the upper end thereof, said baffle constituting the rear wall of said combustion chamber and the exit from said combustion chamber being over said baffle and among the upper end of the first bank of tubes, and a second baffle extending longitudinally along the rear of said first bank from the upper end thereof, and terminating short of the lower end, the major portion of the tubes in the first bank being located between the first and the second baffles, said baffles thereby compelling the heated gases to first enter the upper end of the first bank and then traverse the said first bank longitudinally downwardly from its upper to its lower end and counter to the circulation in the tubes of said bank, substantially as described.

5. A transverse-drum, serial-pass, multiple-bank boiler having the banks provided with baffles, the bank with which the flame and hot gases first contact supporting a baffle in the rear of some of the tubes of the bank and in front of the major portion of the tubes thereof, said baffle forming the rear of the combustion chamber; substantially as described.

6. A transverse-drum, serial-pass, multiple-bank boiler having the banks provided with baffles, the bank with which the flame and hot gases first contact supporting a baffle at the front of said bank and in the rear of some of the tubes thereof and having a baffle at the rear of said bank, the major portion of the tubes of the bank being located between said baffles; substantially as described.

7. A steam boiler having a plurality of upper transverse steam and water drums, a lower transverse mud-drum, banks of tubes connecting said upper and lower drums, a furnace, the first bank of tubes having two baffles supported by the tubes, one of said baffles being at the front and in the rear of some of the tubes of the bank and extending upward to the upper part of the bank and forming the rear wall of the furnace combustion chamber, and the second of said baffles being at the rear of the first bank of tubes to cause the gases to flow downward over the first bank, the major portion of the tubes in said bank being located between the first and the second baffles; substantially as described.

8. A transverse-drum, serial-pass, multiple-bank boiler, comprising three upper drums connected to a lower water compartment by four groups of tubes arranged in fan shape, a combustion chamber which is at least partly overhung by the front group of tubes, baffling comprising a baffle extending upwardly back of the front group to a point short of its upper end, a baffle extending from the upper end of the second group downwardly to a point short of its lower end, and a baffle extending upwardly back of the third group to a point short of its upper end, whereby the gases flow in four up and down passes and downward over the last pass.

9. A transverse-drum, serial-pass, multiple-bank boiler, comprising three upper drums connected to a lower water compartment by four groups of tubes arranged in fan shape, a combustion chamber which is at least partly overhung by the front group of tubes, baffling comprising a baffle extending upwardly back of the front group to a point short of its upper end, a baffle extending from the upper end of the second group downwardly to a point short of its lower end, and a baffle extending upwardly back of the third group to a point short of its upper end, whereby the gases flow in four up and down passes and downward over the last pass, the combustion chamber overhung by the front group of tubes being unobstructed and the tubes directly facing the front setting wall.

JOHN E. BELL.